(12) United States Patent
Oliver

(10) Patent No.: US 6,290,033 B1
(45) Date of Patent: Sep. 18, 2001

(54) MAGNETORHEOLOGICAL DAMPER CHARGING SYSTEM

(75) Inventor: Michael Leslie Oliver, Xenia, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/539,970

(22) Filed: Mar. 31, 2000

(51) Int. Cl.[7] ..................................................... F16D 37/02
(52) U.S. Cl. .................... 188/267.1; 188/352; 267/64.28
(58) Field of Search ........................... 267/64.28, 140.14, 267/140.15; 188/267, 267.1, 267.2, 352

(56) References Cited

U.S. PATENT DOCUMENTS

| | | | |
|---|---|---|---|
| 5,601,164 | * | 2/1997 | Ohsaki et al. ......................... 188/267 |
| 5,956,951 | * | 9/1999 | O'Callaghan ...................... 188/267.1 |

* cited by examiner

Primary Examiner—Matthew C. Graham
(74) Attorney, Agent, or Firm—Scott A. McBain

(57) ABSTRACT

A novel and improved magnetorheological (MR) damper charging system is provided which simply and effectively substantially minimizes MR fluid leakage during a MR damper assembly process thereby minimizing cleanup and reducing costs. The damper charging system includes a charging body having a bore for receiving damper components and damper fluid, at least one inlet formed in the charging body for delivering fluid to the bore, and a magnetic field generating assembly mounted at the inlet and operable in an energized state to generate a magnetic field across the inlet to cause MR fluid in the inlet to experience a MR effect sufficient to prevent leakage flow through and from the inlet. An inlet valve is mounted on the charging body for controlling flow of fluid through the inlet into the bore. The magnetic field generating assembly is positioned to generate magnetic flux within a clearance gap between the valve and the inlet walls thereby blocking flow and preventing leakage through the clearance gap as the MR damper components move past the inlet.

14 Claims, 3 Drawing Sheets

MAGNETORHEOLOGICAL DAMPER CHARGING SYSTEM

RELATED APPLICATION

The present application is related to a U.S. patent application Ser. No. 09/540,583 filed Mar. 31, 2000 and entitled "Magnetorheological Fluid Pumping System, the disclosure of which is incorporated by reference.

TECHNICAL FIELD

The present invention relates to a system for charging magnetorheological (MR) dampers with magnetorheological fluid and other damper components and, more particularly, to a system for effectively loading damper components into a damper cylinder during assembly while minimizing MR fluid leakage.

BACKGROUND OF THE INVENTION

Magnetorheological fluids that comprise suspensions of magnetic particles such as iron or iron alloys in a fluid medium have flow characteristics that can change by several orders of magnitude within milliseconds when subjected to a suitable magnetic field due to suspension of the particles. The ferromagnetic particles remain suspended under the influence of magnetic fields and applied forces. Such magnetorheological fluids have been found to have desirable electro-magnetomechanical interactive properties for advantageous use in a variety of magnetorheological (MR) devices, such as brakes, clutches, mounts and dampers.

In particular, linear acting MR dampers are commonly used in suspension systems, such as a vehicle suspension system and vehicle engine mounts. PCT patent application 10840, published Jan. 8, 1998 (the '840 application), discloses a proposed linear acting controllable vibration damper apparatus which includes a piston positioned in a magnetorheological fluid-filled chamber to form upper and lower chambers. The piston includes a coil assembly, a core, i.e. pole pieces, and an annular ring element positioned around the pole pieces to form an annular flow passage for permitting flow of the magnetorheological fluid between the chambers. A gas cup or diaphragm is positioned at one end of the cylinder to form a pressurized accumulator to accommodate fluid displaced by the piston rod as well as to allow for thermal expansion of the fluid. When the piston is displaced, magnetorheological fluid is forced through the annular flow passage. When the coil is energized, a magnetic field permeates the annular flow passage and excites a transformation of the magnetorheological fluid to a state that exhibits damping forces.

During assembly of a MR damper, magnetorheological fluid is typically injected into a charging assembly and loaded, along with the piston assembly, into the cylinder forming the damper chambers. If included, accumulator gas and a gas cup or diaphragm must also be injected and loaded into the cylinder. A conventional charging assembly includes a charging tube, a set of fill holes and valves for controlling MR fluid and gas flow through the holes. It has been found that MR fluid leakage can occur in the gap around the valve and corresponding hole during movement of the components from the charging assembly into the damper cylinder. This undesirable leakage can accumulate to significant amounts disadvantageously resulting in unacceptable, expensive MR fluid usage and increased clean-up costs.

Therefore, there is a need for a simple, effective and low cost charging system for charging a MR damper with MR fluid without undesirable leakage.

SUMMARY OF THE INVENTION

It is an object of the present invention, therefore, to provide a magnetorheological (MR) fluid damper charging system which effectively charges a MR damper with MR fluid and damper components while minimizing undesirable MR fluid leakage.

This and other objects of the present invention are achieved by providing a magnetorheological damper charging system comprising a charging body including a bore for receiving a damper piston and at least one inlet formed in the charging body for delivering magnetorheological fluid to the bore. The damper charging system also includes a magnetic field generating assembly mounted at the inlet and operable in an energized state to generate a magnetic field across at least a portion of the inlet to cause magnetorheological fluid in the portion of the inlet to experience a magnetorheological effect sufficient to prevent leakage flow through and from the inlet and in a de-energized state to permit fluid flow through the inlet. The charging system may also include a magnetorheological fluid supply and an inlet valve mounted at the inlet for controlling fluid flow from the fluid supply through the inlet into the bore. The inlet valve may be mounted for reciprocal movement between a closed position substantially blocking flow through the inlet and an open position retracted from the inlet. A clearance gap is positioned between the inlet valve and the charging body when the inlet valve is in the closed position so that the magnetorheological effect is experienced in the clearance gap.

The magnetic field generating assembly may include a coil mounted on the inlet valve, and the inlet valve may include a pin element extending through the coil and formed of a magnetic material. The pin element may include a tip portion positionable in the inlet when the valve is in the closed position. The magnetic field generating assembly may further include a nonmagnetic sleeve mounted on the inlet valve axially between the coil and the tip potion.

The system may include a first inlet for delivering magnetorheological fluid to the bore and a second inlet for delivering an accumulator fluid. A first inlet valve may be mounted on the charging body adjacent the first inlet while a second valve is mounted adjacent the second inlet. Each of the first and second inlets includes a clearance gap in which the magnetorheological effect is generated to prevent magnetorheological fluid from leaking from the respective clearance gap.

The present invention is also directed to a method of charging a magnetorheological damper with magnetorheological fluid, comprising the steps of providing a charging body including a bore for receiving a damper piston and at least one inlet formed in the charging body for delivering magnetorheological fluid to the bore. The method further includes the steps of providing a valve at the inlet for controlling flow through the inlet and opening the valve to permit magnetorheological fluid flow through the inlet into the bore. The method also includes the steps of closing the valve to block magnetorheological fluid flow through the inlet and generating a magnetic field across at least a portion of the inlet to cause magnetorheological fluid in at least a portion of the inlet to experience a magnetorheological effect sufficient to prevent leakage from the inlet. The method may further include the steps of inserting a damper piston into the charging body, displacing the damper piston and the magnetorheological fluid from the bore and eliminating the magnetic field from the inlet.

BRIEF DESCRIPTION OF THE DRAWINGS

FIG. 1a is an end view of the MR damper charging system of the present invention;

FIG. 1b is a cross-sectional view of the MR damper charging system of the present invention taken along plane 1b—1b in FIG. 1a;

FIG. 1c is an expanded view of the area A of FIG. 1b;

FIG. 4b is a cross-sectional view of the tip portion of the valve taken along plane 4b—4b in FIG. 4a.

DETAILED DESCRIPTION OF THE INVENTION

Figure 1:
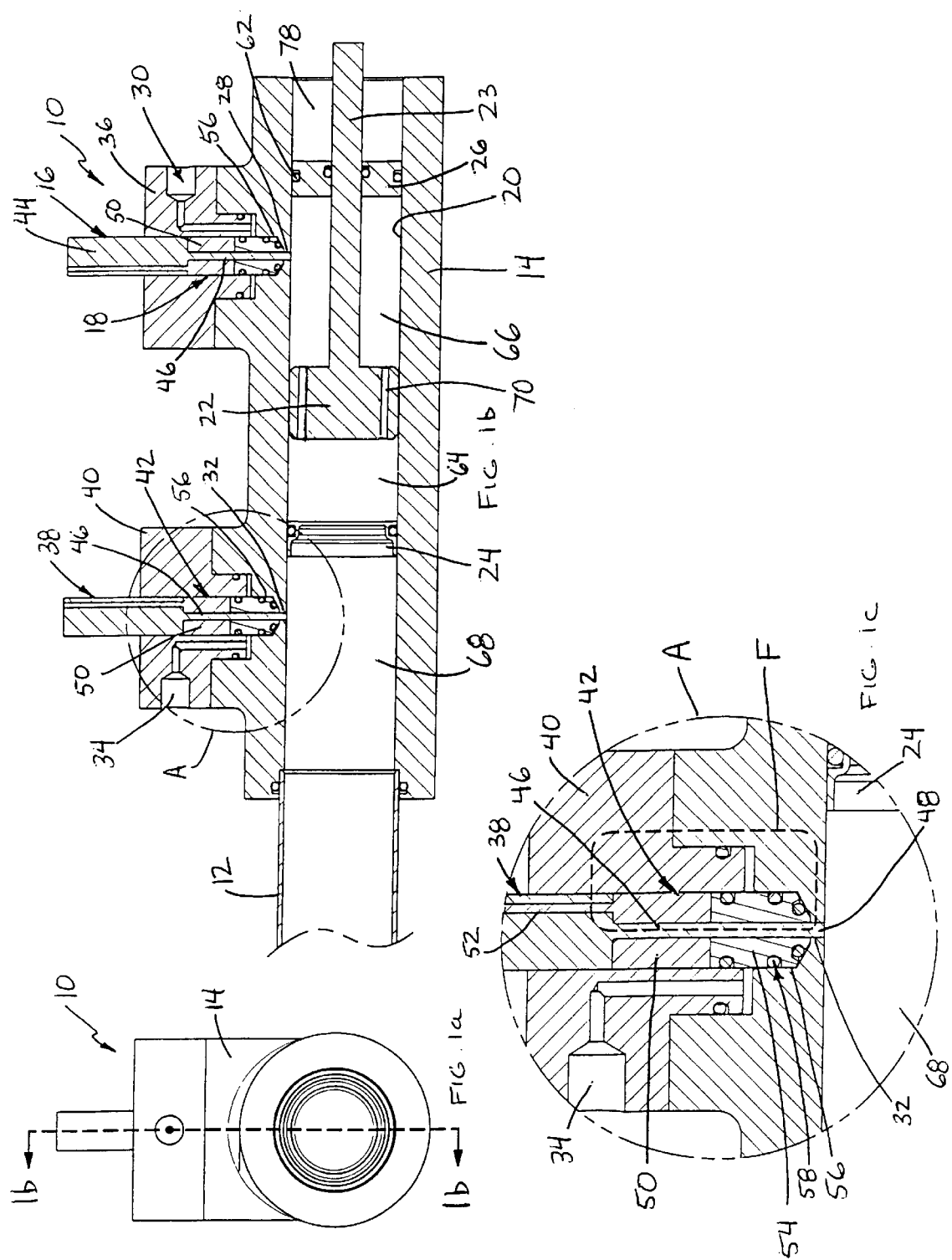

Referring to FIGS. 1a–1c, there is shown the magnetorheological fluid damper charging system of the present invention, indicated generally at 10, designed to effectively minimize leakage of magnetorheological (MR) fluid from the system during filling of the system with magnetorheological fluid and charging an MR damper with magnetorheological fluid and damper components by displacing the fluid and components from the charging system into an MR damper cylinder 12. MR damper charging system 10 generally includes a charging body 14 for engaging damper cylinder 12, a first inlet valve 16 for controlling MR fluid flow into charging body 14 and a first magnetic field generating assembly 18 for reducing MR fluid leakage as discussed more fully hereinbelow.

Specifically, referring to FIG. 1b, charging body 14 includes a longitudinal bore 20 extending therethrough for receiving a damper piston 22 for subsequent displacement out of charging body 14 into damper cylinder 12. During assembly, bore 20 may also receive other damper components, such as a gas cup 24 and a seal cover assembly 26, depending on the type of damper to be assembled. Gas cup 24 will function in the assembled damper as a floating piston separating a MR fluid chamber from a pressurized accumulator volume. The floating piston and accumulator volume of, for example, gas, is necessary to accommodate fluid displaced by piston rod 23 as well as to allow for thermal expansion of the MR fluid thereby permitting effective operation of the assembled MR damper. Of course, damper piston 22 may be any conventional damper used in magnetorheological damping devices while gas cap 24 may be any barrier conventionally used to separate the accumulator chamber from the MR fluid chamber, such as a flexible rolling diaphragm.

Figure 2:
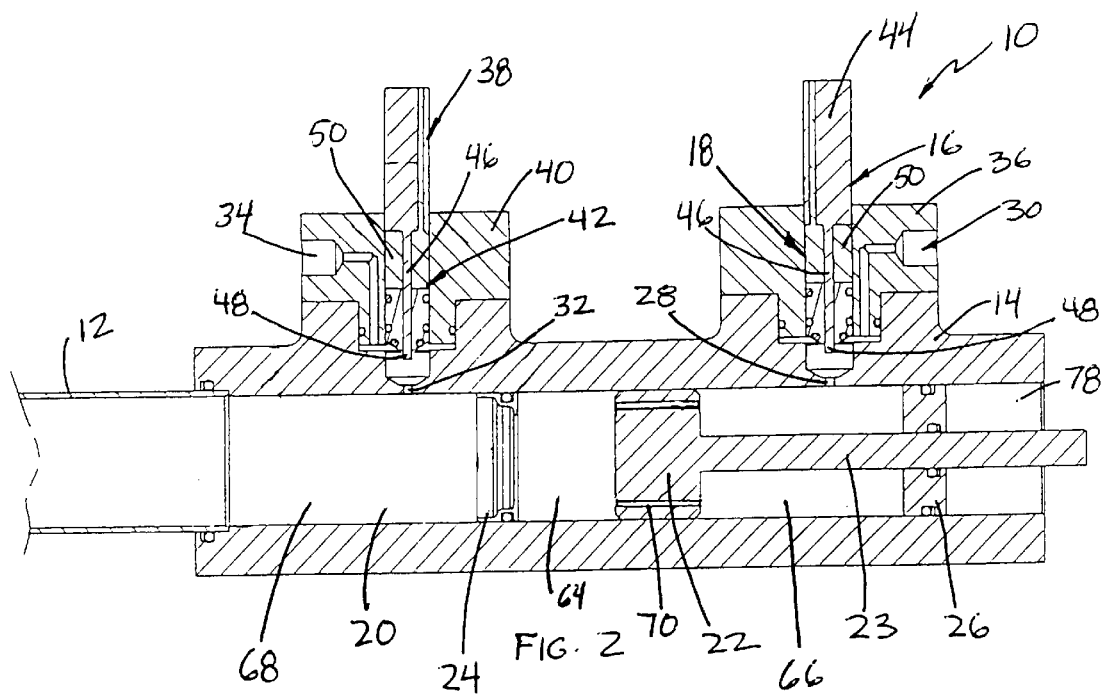
FIG. 2 is a cross-sectional view of the MR damper charging system of the present invention with the inlet valves in the open position.

MR damper charging system 10 also includes a first inlet 28 in the form of a passage communicating at one end with bore 20 and at an opposite end with a MR fluid supply circuit 30 as best shown in FIGS. 1b and 2. A second inlet 32 is positioned a spaced axial distance along bore 20 from first inlet 28 and likewise communicates with bore 20 at one end while communicating with an accumulator gas supply circuit 34 at an opposite end. First inlet valve 16 is mounted for reciprocal movement in a valve block 36 mounted on charging body 14. Charging system 10 also includes a second inlet valve 38 mounted for reciprocal movement in a second valve block 40 secured to charging body 14 adjacent second inlet 32. First and second inlet valves 16, 38 operate in substantially the same manner to control MR fluid and gas flow, respectively, through first and second inlets 28, 32. Specifically, as discussed more fully hereinbelow, first and second inlet valves 16, 38 are moved between a closed position (FIG. 1b) blocking fluid and gas flow through the respective first and second inlets 28, 32 and an open position (FIG. 2) permitting fluid and gas flow through the inlets. First and second inlet valves 16, 38 may be operated by any conventional actuating device capable of selectively and effectively moving the valves between the open and closed positions.

Importantly, MR damper charging system 10 of the present invention also includes magnetic field generating assembly 18 associated with first inlet valve 16 and a magnetic field generating assembly 42 associated with second inlet valve 38. The specific structure of first inlet valve 16 and magnetic field generating assembly 18 will now be discussed in detail. A construction of second inlet valve 38 and magnetic field generating assembly 42 is identical to first inlet valve 16 and magnetic field generating assembly 18 and, therefore, although the valve structure is most clearly shown in FIG. 1c with respect to second inlet valve 38, the following description will cover both valves and magnetic field generating assemblies. First and second inlet valves 16, 38 each 20 includes a valve body 44 including integral pin element 46 extending from valve body 44. Pin element 46 includes a tip portion 48 positioned at an outer distal end for positioning within the respective inlet 28, 32 when the respective valve is in a closed position. Magnetic field generating assemblies 18 and 42 each include a coil 50 mounted on the valve body 44 and positioned around pin element 46. Coil 50 is connected to an electrical source (not shown) via electrical leads 52. Magnetic field generating assemblies 18 and 42 also include a non-magnetic sleeve 54 securely mounted on pin element 46 adjacent tip portion 48 for engaging a corresponding valve recess 56 formed in charging body 14. Nonmagnetic sleeve 54 is formed of a nonmagnetic material, such as stainless steel. As best shown in FIG. 1c, various O-ring grooves and complementary O-rings 58 may be formed in and positioned on the outer surface of nonmagnetic sleeve 54 to form an effective seal against the inner wall of valve recess 56 when first and second inlet valves 16 and 38 are in the closed position.

Magnetic field generating assemblies 18 and 42 effectively generate a magnetic field or flux which minimizes unwanted leakage during operation in the following manner. First, it should be noted that pin element 46, charging body 14 and valve blocks 36, 40 are all formed of magnetic material. When first and second inlet valves 16, 38 are in the closed position as shown in FIG. 1b, electrical current may be supplied to coil 50 via leads 52. Upon energization of coil 50, a magnetic field is generated in a pattern as shown in FIG. 1c as magnetic flux is channeled by nonmagnetic sleeve 54 through pin element 46. With specific reference to FIG. 4a, the magnetic lines of flux specifically extend from tip portion 48 of pin clement 46 across an inherent annular clearance gap 60 (FIG. 4b) formed between tip portion 48 and the surrounding wall forming first and second inlets 28, 32 into charging body 14. As a result, magnetorheological fluid present in clearance gap 60 experiences a magnetorheological effect sufficient to prevent leakage flow through, and MR fluid flow from, clearance gap 60. This stabilization of MR fluid in clearance gap 60 thereby prevents the MR fluid in clearance gap 60 from flowing into bore 20. The MR effect experienced by the MR fluid in clearance gap 60 prevents clearance gap 60 from functioning as a drain passage permitting flow around an outer seal 62, i.e. O-ring, positioned on the outer surface of seal cover assembly 26.

Figure 3:
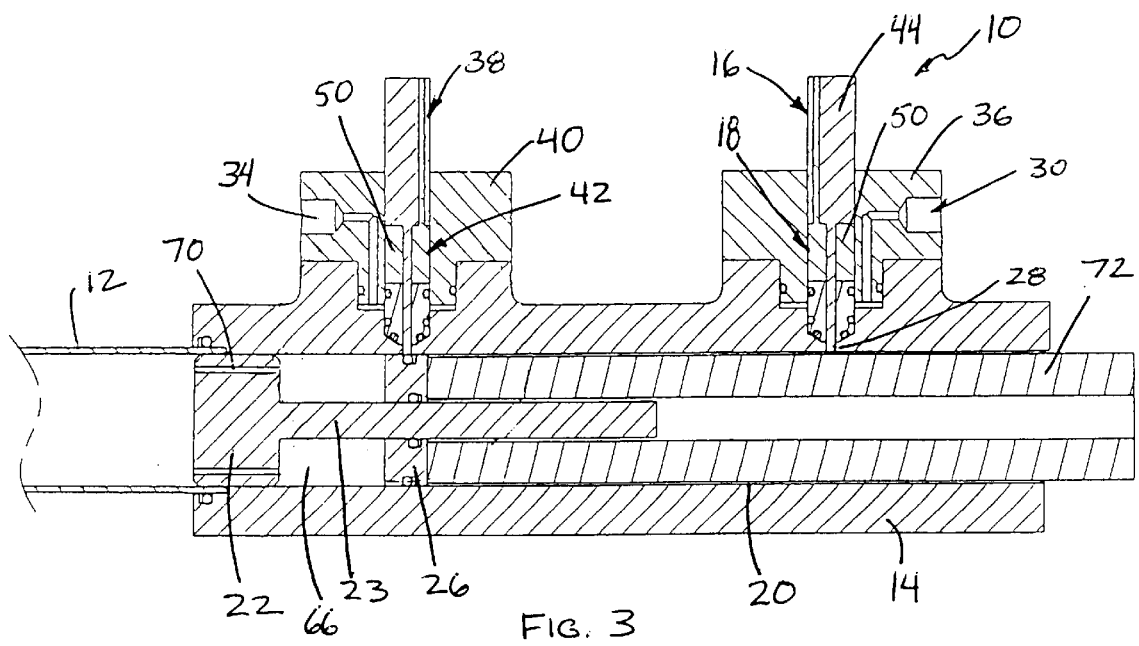
FIG. 3 is a cross-sectional view of the MR damper charging system of the present invention with the inlet valves in the closed position.
Figure 4A:
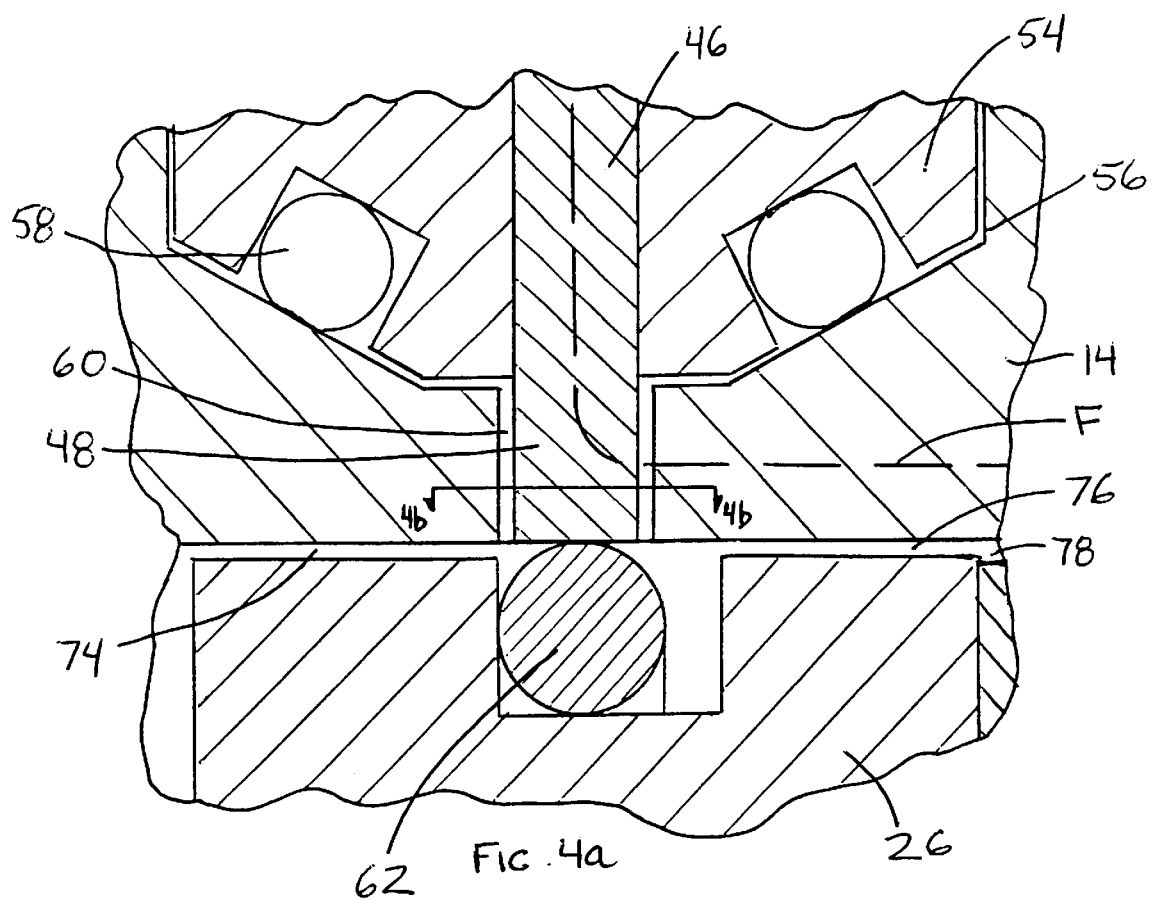
FIG. 4a is an expanded cross-sectional view of the tip portion of the inlet valve of FIG. 3 in the closed position.
Figure 4B:
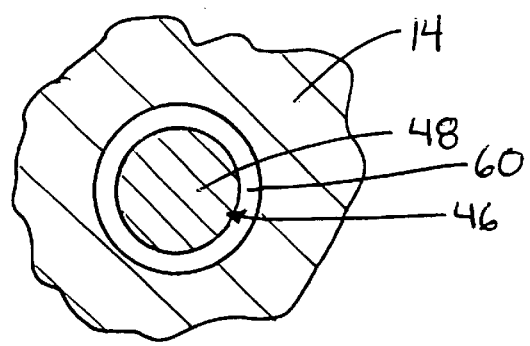

A better understanding of the advantage of the present charging system in minimizing undesirable leakage will best be understood in conjunction with a description of the operation of charging system 10. As shown in FIG. 1b, first and second inlet valves 16 and 38 are initially in a closed position blocking fluid flow through the respective inlets. Damper cylinder 12 is connected to one end of charging body 14 while gas cup 24, damper piston 22 and seal cover assembly 26 are moved into position within bore 20. Gas cup 24 is positioned in bore 20 between first inlet 28 and second inlet 32 while damper piston 22 is also positioned between first and second inlets 28, 32 to the right of gas cup 24 as shown in FIG. 1b. Referring to FIG. 2, at a preselected moment, first and second inlet valves 16, 38 are moved into an open position to permit MR fluid flow from fluid supply circuit 30 through first inlet 28 into chamber 66 and gas from gas supply circuit 34 to flow through second inlet 32 into a gas chamber 68 to the left of gas cup 24. During this filling operation, MR fluid flows from chamber 66 through conventional passages 70 formed in damper piston 22 into chamber 64 thereby filling both chambers 66 and 64. Once the chambers are full, first and second inlet valves 16, 38 are moved back into the closed position as shown in FIG. 1b blocking MR fluid and gas flow into the respective chambers. A press member 72, which may have been previously used to insert each damper component into bore 20, is then moved to the left in bore 20 as shown in FIG. 3 so as to displace seal cover assembly 26, damper piston 22 and gas cup 24 toward damper cylinder 12. During this pressing operation, seal cover assembly 26 necessarily moves past both first inlet 28 and second inlet 32, for example, as shown in FIG. 3 with respect to second inlet 32. During this movement, seal 62, positioned on seal cover assembly 26, will reach the position shown in FIG. 4a, with respect to both first inlet 28 and second inlet 32. As shown in FIG. 4a, clearance gap 60, formed between tip portion 48 and the wall of charging body 14 forming the respective inlet, communicates with a first cover clearance gap 74 formed on one side of seal 62 and a second cover clearance gap 76 extending from an opposite side of seal 62. As a result, in conventional systems, when seal cover assembly 26 is in the position shown in FIG. 4a relative to both first inlet 28 and second inlet 32, a fluid flow path is created which disadvantageously causes MR fluid flow from MR fluid chamber 66 through cover clearance gap 74, clearance gap 60 and cover clearance gap 76 into an outer chamber 78. This leakage flow of MR fluid into outer chamber 78 creates a waste quantity of MR fluid, more difficult cleanup and thus increased cost since chamber 78 is open to the surrounding environment. The system and method of the present invention solves this leakage problem by energizing magnetic field generating assemblies 18 and 42 upon first inlet valve 16 and second inlet valve 38 being moved into the closed position after filling is complete and before pressing the components inwardly from the position shown in FIG. 1b. The magnetorheological effect experienced by the MR fluid in clearance gap 60 of both first inlet 28 and second inlet 32 causes the MR fluid to increase in viscosity sufficiently to block fluid flow through clearance gap 60. Accordingly, MR fluid leakage between chamber 66 and outer chamber 78 via clearance gap 60 is substantially eliminated. Also, after seal cover assembly 26 moves completely past first inlet 28, magnetic flow generating assembly 18 remains energized so as to prevent leakage of MR fluid in clearance gap 60 from draining into outer chamber 78 both before and after the removal of press member 72 which occurs after completely displacing the components and fluid into damper cylinder 12. Likewise, magnetic field generating assembly 42 preferably remains energized after seal cover assembly 26 passes second inlet 32 to prevent leakage of MR fluid in clearance 60 which entered clearance 60 as chambers 64 and 66 passed over clearance 60.

In summary, the MR damper charging system 10 of the present invention effectively substantially minimizes MR fluid leakage during the MR damper assembly process thereby reducing costs associated with MR fluid consumption and MR fluid cleanup while avoiding environmental challenges associated with magnetorheological fluid spillage. In addition, the present MR damper charging system effectively eliminates the undesirable leakage of MR fluid into gas chamber 68 which is also undesirable.

What is claimed is:

1. A magnetorheological damper charging system, comprising:
 a charging body including a bore for receiving a damper piston and at least one inlet formed in the charging body for delivering a fluid to said bore; and
 a magnetic field generating assembly mounted adjacent said at least one inlet and operable in an energized state to generate a magnetic field across at least a portion of said at least one inlet to cause magnetorheological fluid in said at least a portion of said at least one inlet to experience a magnetorheological effect sufficient to prevent leakage flow through and from said at least one inlet and in a de-energized state to permit fluid flow through said at least one inlet.

2. The system of claim 1, further including a magnetorheological fluid supply and at least one inlet valve mounted at said at least one inlet for controlling fluid flow from said magnetorheological fluid supply through said at least one inlet into said bore.

3. The system of claim 2, wherein said at least one inlet valve is mounted for reciprocal movement between a closed position substantially blocking flow through said at least one inlet and an open position retracted from said at least one inlet, further including a clearance gap positioned between said at least one inlet valve and said charging body when said at least one inlet valve is in said closed position, said at least a portion of said at least one inlet including said clearance gap.

4. The system of claim 3, wherein said magnetic field generating assembly includes a coil mounted on said at least one inlet valve, said at least one inlet valve including a pin element extending through said coil and fonned of magnetic material.

5. The system of 4, wherein said pin clement includes a tip portion positionable in said at least one inlet when said at least one inlet valve is in said closed position, said magnetic field generating assembly further including a nonmagnetic sleeve mounted on said at least one inlet valve axially between said coil and said tip portion.

6. The system of claim 1, wherein said at least one inlet includes a first inlet for delivering magnetorheological fluid to said bore and a second inlet for delivering an accumulator fluid, further including a first inlet valve mounted on said charging body adjacent said first inlet and a second inlet valve mounted on said charging body adjacent said second inlet.

7. The system of claim 6, further including a respective clearance gap positioned between each of said first and said second inlet valves and said charging body when the inlet valves are in a closed position, wherein a respective magnetic field generating assembly is positioned to generate a magnetic field in said respective clearance gap to prevent leakage of magnetorheological fluid from said respective clearance gap.

8. The system of claim 6, wherein said magnetic field generating assembly includes a coil mounted on each of said first and said second inlet valves.

9. A method of charging a magnetorheological damper with magnetorheological fluid, comprising the steps of:
   providing a charging body including a bore for receiving a damper piston and at least one inlet formed in the charging body for delivering fluid to said bore;
   providing at least one valve at said at least one inlet for controlling flow through said at least one inlet;
   opening said at least one valve to permit a fluid to flow through said at least one inlet into said bore;
   closing said at least one valve to block the fluid flow through said at least one inlet; and
   generating a magnetic field across at least a portion of said at least one inlet to cause magnetorheological fluid in said at least a portion of said at least one inlet to experience a magnetorheological effect sufficient to prevent leakage flow from said at least one inlet.

10. The method of claim 9, further including a clearance gap positioned in said at least one inlet between said at least one valve and said charging body when said at least one valve is in a closed position.

11. The method of claim 9, further including the step of providing a coil mounted on said at least one valve.

12. The method of claim 10, wherein said at least one valve includes a pin element formed of magnetic material, said pin element including a tip portion for insertion into said at least one inlet, said magnetic field being generated in said clearance gap between said tip portion and said charging body.

13. The method of claim 9, further including the steps of inserting a damper piston and a seal cover into said charging body, displacing the damper piston, the seal cover and said magnetorheological fluid from said bore and eliminating the magnetic field from said at least one inlet.

14. The method of claim 9, wherein said at least one inlet includes a first inlet for delivering magnetorheological fluid to said bore and a second inlet for delivering an accumulator fluid, wherein said at least one valve includes a first valve mounted on said charging body adjacent said first inlet and a second valve mounted on said charging body adjacent said second inlet.

* * * * *